United States Patent [19]

Heyn et al.

[11] 4,425,757
[45] Jan. 17, 1984

[54] INSTALLATION FOR RECOVERING ENERGY FROM SOLID FOSSIL FUELS, MORE PARTICULARLY BITUMINOUS COAL HIGH IN INERTS

[75] Inventors: Klaus Heyn; Hans J. Pogrzeba, both of Essen, Fed. Rep. of Germany

[73] Assignee: Steag Aktiengesellschaft, Essen, Fed. Rep. of Germany

[21] Appl. No.: 220,738

[22] Filed: Dec. 29, 1980

Related U.S. Application Data

[62] Division of Ser. No. 925,708, Jul. 18, 1978, Pat. No. 4,255,926.

[30] Foreign Application Priority Data

Jul. 21, 1977 [DE] Fed. Rep. of Germany ....... 2733029

[51] Int. Cl.³ .............................................. F02C 6/18
[52] U.S. Cl. ................................ 60/39.182; 122/7 R
[58] Field of Search ......... 60/39.12, 39.18 B, 39.46 S; 122/4 D, 7 R; 55/73

[56] References Cited

U.S. PATENT DOCUMENTS

| | | | |
|---|---|---|---|
| 2,055,385 | 9/1936 | Noack | 60/39.46 S |
| 2,184,845 | 12/1939 | Noack | 60/39.18 B |
| 3,687,115 | 8/1972 | Bell | 122/7 R |
| 4,078,390 | 3/1978 | Duvall | 55/73 |

Primary Examiner—Louis J. Casaregola
Attorney, Agent, or Firm—Andrus, Sceales, Starke & Sawall

[57] ABSTRACT

An installation for recovering energy from solid fossil fuels more particularly bituminous coal high in inerts consists of at least one unit in which the solid fuels are converted into gas. A gas-turbine and a steam-turbine are provided to recover the energy from the gases. The gases are freed of dust and desulfurized before the gas turbine. The installation is characterized in that a wet-bottom boiler using the ground fuel is provided with pressure firing, the flue gases therefrom being passed to a gas-gas heat exchanger, the desulfurizing unit and dust-removing unit before being utilized in the gas-turbine.

4 Claims, 5 Drawing Figures

INSTALLATION FOR RECOVERING ENERGY FROM SOLID FOSSIL FUELS, MORE PARTICULARLY BITUMINOUS COAL HIGH IN INERTS

This application is a divisional application of copending application Ser. No. 925,708, filed July 18, 1978 and now U.S. Pat. No. 4,255,926, issued Mar. 17, 1981.

The invention relates to an installation for recovering energy from solid fossil fuels, more particularly fuels high in inerts and particularly bituminous coal, the said installation consisting of at least one unit in which the solid fuels are converted into gas, a gas-turbine and steam-turbine being provided to recover electrical energy from the gases, and the said gases being freed from dust and desulphurized in the unit before the gas-turbine.

The advantage of such units is that, with a suitable combination of the gas-turbine and steam-turbine processes, they provide higher thermal efficiency than a conventional arrangement of individual processes. The dust-removal serves to clean the gases to such an extent that although the coal used is high in inerts, the said gases may be fed to the gas-turbine. The desulphurization is carried out at a high pressure level and therefore has advantages over known unpressurized flue-gas desulphurization, in that the desulphurizing units are smaller and have lower losses; in the case of adsorptive desulphurization, the adsorption losses are reduced by the increased pressure. For this reason, installations of this kind cause very little pollution.

So-called solid-bed pressure gasification is already known. In installations of this kind, coal, mostly high in inerts, is gasified, i.e. partly burned, with some of the combustion air available, and with steam, under high pressure. In known installations of this kind, the gasification pressure is about 20 bars. The gasification is carried out in a reactor which produces lean gas at a temperature of between 500° and 600° C., which is cooled and then passes to dust-removing and desulphurizing units. The cleaned lean gas is burned as fuel gas in a boiler under pressure, the flue-gases from which are used to operate the gas-turbine, while the steam produced in the boiler drives the steam-turbine.

The pressure-gasification of coal, however, results in a series of losses. Some of these are due to the relatively large amount of unburned fuel in the ash removed from the reactor, which has hitherto amounted to more than 10%. Further losses arise from so-called jacket steam, i.e. evaporation of the cooling water fed to the pressure-gasification unit. Other losses are due to the evaporation of water used in so-called quenching. Finally, still further losses are due to the fact that an appreciable amount of the water used in washing the gases is never removed, but remains in the fuel gas in the form of spray and must therefore be evaporated in the firing of the boiler.

Other disadvantages associated with the pressure-gasification of coal arise from operating difficulties. During the cooling of the lean gas, tar is condensed and this deposited on the dust which is also present in the lean gas. This produces a mixture of dust and tar which soon leads to incrustation and blocking of the various circuits in which it occurs, and from which it therefore has to be removed. If substantial heat losses are to be avoided, the mixture of dust and tar must be separated from the washing medium in a tar-separator or the like unit, and must be returned to the gas-producer. This returning of the tar raises problems, since the dust-containing tar can be pumped only to a limited extent and this always causes operational problems.

Pressure gasification units for coal hitherto used are also relatively difficult to control. More particularly, the gas-discharge temperature, calorific value, dust content, and tar content are not very constant, which is attributable mainly to the intermittent supply of coal to the gas-producer. Furthermore, a rapid load increase is impossible if an adequately high calorific value of the fuel gases is required at the same time. These problems make an adequately sensitive output control impossible.

Finally, it should be pointed out that, because of their low calorific value, the fuel gases also cause problems during combustion in the boiler, and there are always occasions when combustion has to be assisted with additional fuels, more particularly fuel oil.

Also known is an installation of the type described at the beginning hereof in which the fuel is burned and desulphurized in the fluidized bed. To this end, the ground fuel and desulphurizer are fed to the fluidized bed and the fuel is burned under pressure, in suspension. The transfer of heat to the steam process is carried out within the fluidized bed, whereby the combustion temperature is restricted to about 900° C. The flue-gas emerging from the fluidizing chamber, and containing large amounts of ash, unburned fuel, and partly charged desulphurizer, must then be fed to a gas-turbine. So far there is no known way of producing a gas clean enough for a machine from these flue gases.

If the approach used is to burn the ground fuel in a fluidizing chamber, this has numerous disadvantages, since considerable amounts of unburned fuel in the ash must also be expected. One particularly difficult problem is that the unburned fuel is discharged from the fluidizing chamber with the flow of flue-gas and therefore inevitably reaches the subsequent dust-removing unit. Separating the ash produced by the fuel, and the partly charged desulphurizer, from the flow of flue-gas present considerable difficulties. Another problem is separating the partly-charged desulphurizer from the ash in order to condition the desulphurizer. In addition to this are wear problems at the heating surfaces which have to be arranged in the fluidized bed. This wear is caused mainly by the erosion which inevitably occurs in a fluidized bed. Accurate control of fluidized-bed temperatures also causes problems, since if these temperatures become too high, the ash softens and bakes onto the fluidized bed and heating surfaces, whereas if the fluidized-bed temperature is too low, there is a reduction in combustion, i.e. an increase in fuel losses. Partial carbonization also occurs, which in turn leads to tar condensation and to baking onto the fluidized bed and heating surfaces.

It is the purpose of the invention, in the case of installations of the type described at the beginning hereof, to reduce the losses and operational difficulties, and to design the installation in such a manner that it may also be used as a peak-load power station.

According to the invention, this purpose is achieved in that a wet-bottom boiler, accommodating the ground fuel, is provided with pressure firing, the flue-gases therefrom being passed to desulphurizing and dust-removing units before being turned to account in the gas-turbine.

Since the combustion (partial combustion and post-combustion) is carried out in one unit, the two procedures may be controlled jointly in the manner required for a peak-load power station, i.e. the output may be increased and reduced relatively quickly and thus adapted to the load, without incurring heat losses and without assisting the combusion process with oil or other additional fuels. Since the combustion of the fuel used takes place in a wet-bottom boiler, this eliminates the occurrence of tar, dispenses with the equipment needed to handle it, and does away with the difficulties associated therewith. The pressures at the flue-gas end of the wet-bottom boiler are 10 bars, for example, which corresponds approximately to the compression ratio of the gas-turbine.

The main advantages of the new installation are, on the one hand, that there is a negligible amount, too small to be measured, of unburned fuel remaining in the slag of the wet-bottom boiler. Furthermore, the thermal efficiency is substantially higher, since there are no losses by evaporation externally of the steam circuit—this has hitherto been unavoidable in the gasification of fuel. The small amount of water in the flue-gas also assists in improving the thermal efficiency. Upon this is based the low condensation point and relatively low waste-gas loss.

Another advantage is that most of the ash is removed from the boiler in granular form and does not get into the machine gas. This granular material may also be processed for other uses.

According to another characteristic of the invention, the flue-gases may be removed after the radiation portion of the boiler, and heat-exchange surfaces are provided for these flue-gases externally of the boiler, the said heat-exchange surfaces being used to adjust the flue-gas temperature before the gas-turbine. They also produce the steam which is fed to the steam process. It is also advantageous to burn the fuel directly in a unit under pressure in the cyclone since, as compared with conventional gasification technology, this dispenses with a number of additional units (gas producers), and the combustion unit is substantially smaller than that required in fluidized-bed technology.

It is also possible to arrange the heat-exchange surfaces, used to adjust the temperature of the flue-gas before the gas-turbine, in the flue-gas desulphurizing unit, or the said heat-exchanger surfaces may be located thereafter.

The actual desulphurizing may be carried out with metal carbonates or oxides, in which case it is possible to operate with a solid bed in which the desulphurizer is in the form of pellets or briquettes. On the other hand, it is also possible to use a fluidized bed, or to inject the desulphurizer into the desulphurizing chamber in the form of a dry dust.

At the flue-gas end it is possible to locate, after the abovementioned heat-exchange surfaces, a dry flue-gas dust-removing unit at the existing high pressure level. A unit of this kind may operate with ceramic filter-candles or with separator nozzles. If required, a hot cyclone may be installed as a pre-separator before the actual dust-removing unit.

As regards subsequent equipment, the invention has the advantage that the heat-exchange surfaces behind the radiating portion of the boiler are substantially smaller than the proposed fluidized bed and erosion is therefore less. Moreover, separation of the desulphurizer from the ash is improved because there is considerably less ash than in the fluidized-bed process. This again is a considerable advantage.

In installations of this kind therefore, the invention reduces losses due to unburned fuel in the ash, those due to the quenching water, and operational difficulties, especially those related to mixtures of tar and dust, moreover the installation is designed in such a manner that it may be used as a peak load power station.

To this end, according to the invention, combustion (partial combustion and post-combustion) takes place in one part of the installation, which means that only one process has to be controlled. This control may be as required for a peak-load power station, i.e. the output may be raised and lowered relatively quickly, and may thus be adapted to the load, without heat losses and without assisting the combustion process with oil or other additional fuels. Since combustion of the fuel takes place in a wet-bottom boiler, no tar is produced, and this dispenses with the equipment hitherto needed to handle it, and with the problems associated therewith. At the flue-gas end of the wet-bottom boiler, the pressures obtaining are 10 bars, for example, which corresponds approximately to the compression ratio of the gas-turbine.

An installation of this kind ensures mainly that the amount of unburned fuel in the slag of the wet-bottom boiler is negligible, even too small to be measured. The thermal efficiency is considerably higher, since losses due to evaporation of quenching water externally of the steam circuit are very largely eliminated, and these have hitherto been unavoidable in the gasification of fuels. Finally, it is an advantage that most of the ash is removed from the boiler in granular form and does not get into the machine gas, and this granular material may be processed for other uses. Moreover, since the fuel is burned directly in a unit under pressure in the cyclone, several additional units (gas producers) are eliminated, as compared with conventional gasification technology, and the combustion unit is substantially smaller than those used in fluidized-bed technology.

However, it is also a purpose of the invention to provide, in installations of the type described hereinbefore, for dust-removing and desulphurizing to be carried out at relatively low temperatures, and for other detrimental substances also to be removed.

To this end, according to the invention, a gas-gas heat exchanger is arranged after the boiler, where the hot flue-gases are cooled with cold, cleaned flue-gas.

In this case a cyclone may be inserted between the super-charged boiler and the gas-gas heat exchanger for rough-cleaning of the flue-gas. In the said heat exchanger, the roughly precleaned flue-gas is cooled by the flue-gas cleaned in the subsequent installation. According to the invention, the necessary temperature differential in the gas-gas heat exchanger may be obtained by locating, after the gas-gas heat exchanger, an additional heat exchanger in which the feed-water for the steam process is preheated, thus cooling the flue-gas still further. This arrangement has the advantage that, in a subsequent gas-washing unit using water, the flue-gas picks up little or no water, and evaporation losses are thus kept small. The disadvantage of the arrangement is that the steam-circulating process is thereby decarnotized.

Another way of producing the necessary temperature differential is by adiabatically saturating the flue-gas with water in the subsequent water-wash.

After the flue-gas has been cooled as described above, the gas is present saturated with steam at temperatures somewhat above 100° C., at which time dust and detrimental substances such as chlorine, fluorine, NO$_x$ and SO$_2$ may be removed therefrom by conventional methods.

The invention has the advantage that the cleaning stages operate at a pressure of about 10 atm., and therefore require comparatively very small units. Furthermore, the temperature level of the flue-gas in this installation is about 40° C. lower than in known installations, and this improves both desulphurization and the removal of other detrimental substances such as chlorine, fluorine and NO$_x$. After passing through the cleaning unit and the subsequent spray-separator, the cleaned flue-gas is reheated in the gas-gas heat exhanger and fed to a gas-turbine. The flue-gas emerging from the gas-turbine passes to a waste-heat boiler where it heats up the feed-water for the steam-circulating process and is thereby cooled to temperatures of about 120° C.

Details, further characteristics, and other advantages of the invention may be gathered from the following descriptions of a plurality of examples of embodiment of the installation according to the invention, in conjunction with the drawings attached hereto, wherein.

Figure 1:
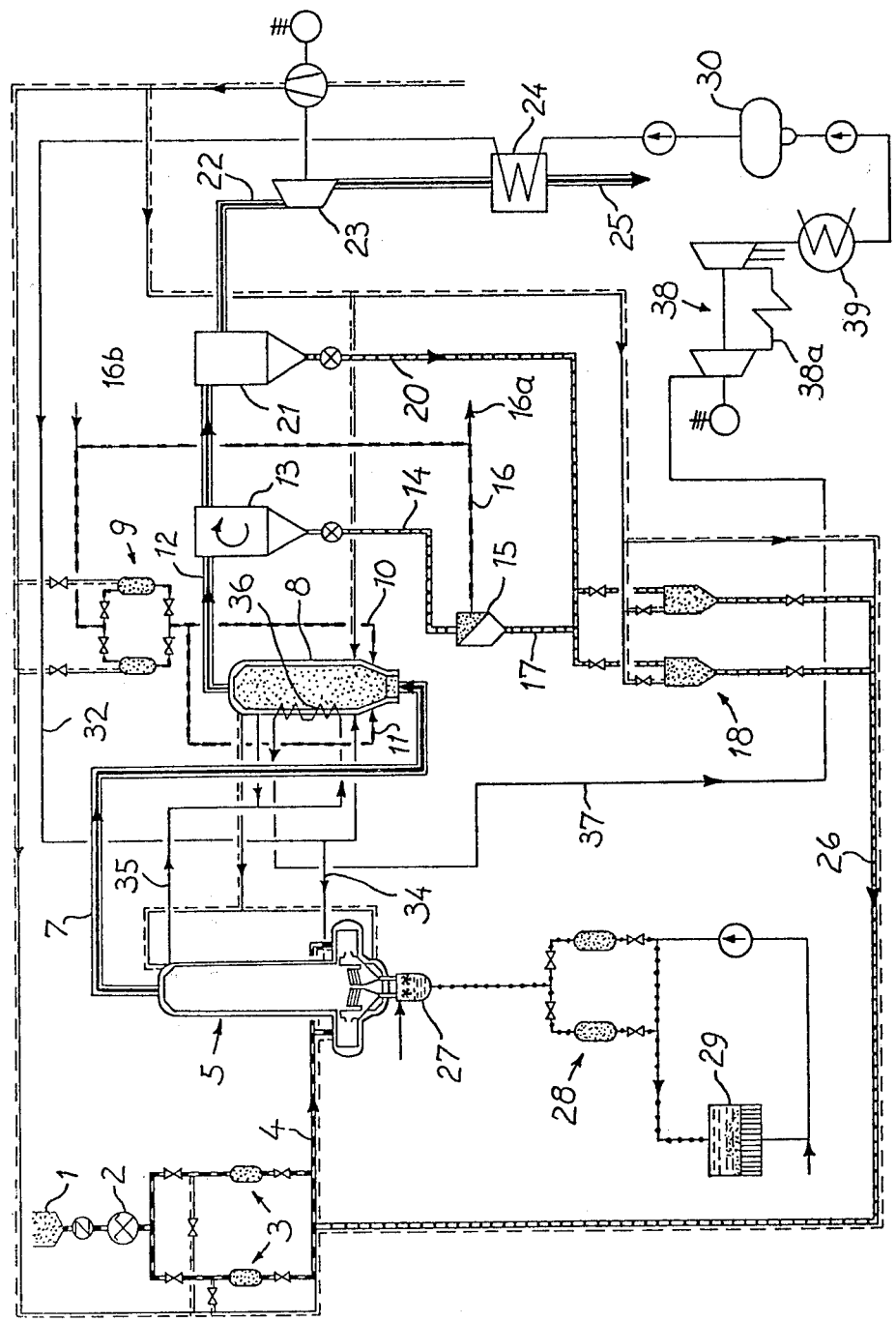
FIG. 1 illustrates a first example of an embodiment of the installation according to the invention, with fluidized-bed desulphurization of the flue-gases.

Coal high in inerts is fed from a bunker 1 to a grinding unit 2, whence the ground fuel passes, through a gate 3, to a line 4 running to the cyclone firing of a wet-bottom boiler generally marked 5.

In the drawing, line identification is in accordance with German Industrial Standard 2481.

The flue-gases are removed at 7 and pass, in the installation according to FIG. 1 into a fluidized-bed desulphurizer 8. The desulphurizing agent used may be, for example limestone which is fed, through a gate unit 9, to the desulphurizing unit at 10 and 11. The desulphurized flue-gases leave the fluidized bed at 12 and pass to a cyclone 13, which removes coarse solids from the gas. These solids are removed at 14 and passed to a grading unit 15 which may consist of a plurality of screens. The overflow from the screens passes, through a line 16 for further processing or use, whereas the through-put is removed at 17 and, according to the example of the embodiment illustrated, passes to a gate 18. Fine dust reaches this gate through a line 20. The fine-dust separator (a separator nozzle or filter) is marked 21. The flue-gas from which the coarse dust has been removed is passed to this separator.

The flue-gases leave separator 21 at a temperature of between 800° and 900° C. and pass through a line 22 to a gas-turbine 23 following a waste-heat boiler 24. After this boiler, the flue-gases are released to the outside air at 25.

In the example of embodiment illustrated, provision is made for the release of the separated fine dust, through gate unit 18, pneumatically, through a line 26, back to line 4. In this way, some of the dust is returned to wet-bottom boiler 5.

The dust and ash are removed as a fluid from the wet-bottom boiler 5 and pass to a hydraulic ash-removing unit with a granule crusher, marked 27 in the drawing. The ash granules are separated at 29 by a gate 28 from the water carrying them, and are removed.

Boiler-feed water, which is fed at 30 to waste-heat boiler 24, flows through a line 32 equipped at 34 with a branch communicating with the radiating portion of boiler 5. Steam leaves the boiler 35 and passes, in the example of embodiment illustrated, through a heat-exchanger 36 arranged in fluidized-bed desulphurizer 8. The steam then flows through a line 37 to a steam-turbine unit 38 with intermediate superheater 38a followed by a condenser 39.

As may be seen, the fossil fuels in the form of coal are fed directly to the combination unit described above. This also applies to the installations illustrated in FIGS. 2 and 3.

Figure 2:
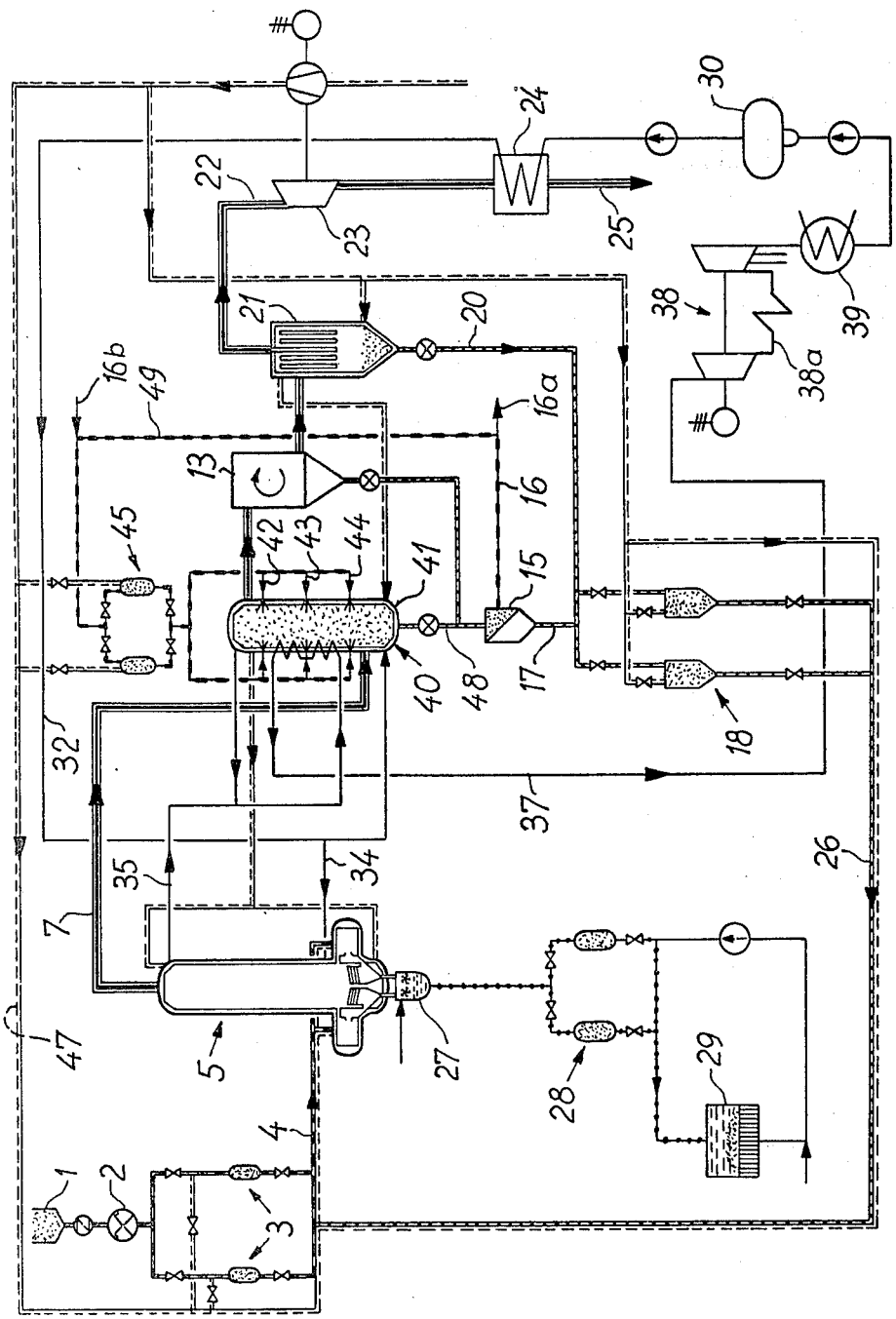
FIG. 2 illustrates an example of an embodiment using a modified (injection) desulphurizing unit.

The example of embodiment according to FIG. 2 differs from that in FIG. 1 mainly in the type of desulphurization to which the flue-gases from line 7 are subjected. The desulphurizing unit is marked 40 in FIG. 2. The medium used is a dry dust forming desulfurizer which is fed to desulphurizing vessel 41 at various points, through nozzles marked 42–44. Again, the desulphurizing medium is fed pneumatically, through a gate unit 45, from air-supply line 47 shown in dotted lines, to the said nozzles.

The sulfur and associated desulphurizer leave vessel 41, through a line 48, as a solid and is thereafter passed to the grading unit 15. The desulfurizer and associated sulfur leave the grading unit 15 in an overflow at 16. Some of the desulphurizer is again passed, through a line 49, to the gate, while some is removed at 16a for processing or further use. The amount removed is replaced at 16b with fresh desulphurizer.

Figure 3:
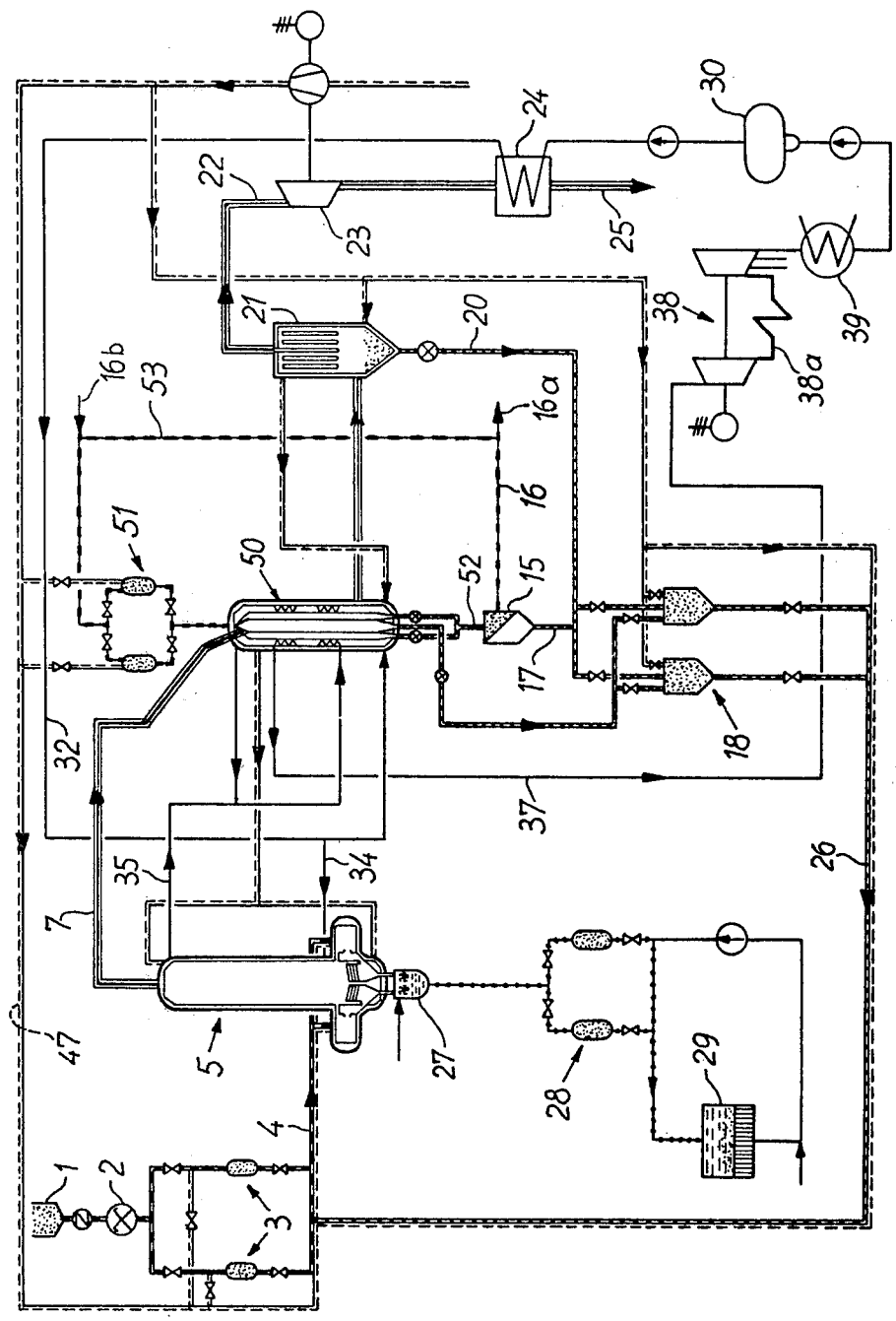
FIG. 3 illustrates an example of an embodiment of an installation according to the invention which makes use of a solid-bed desulphurizing unit.

In the example of embodiment according to FIG. 3 the desulphurizing is carried out, as fluidized-bed desulphurizing, in a reaction vessel 50. In this case, the desulphurizer may be in the form of pellets or briquettes and may be fed, through a gate, continuously or intermittently. If the desulphurizer and its accompanying sulphur are removed from vessel 50, this product again reaches, at 52, the screen overflow from grading unit 15 and thus passes to line 16, from which the conditioned desulphurizer may be returned, at 53, to the process.

Figure 4:
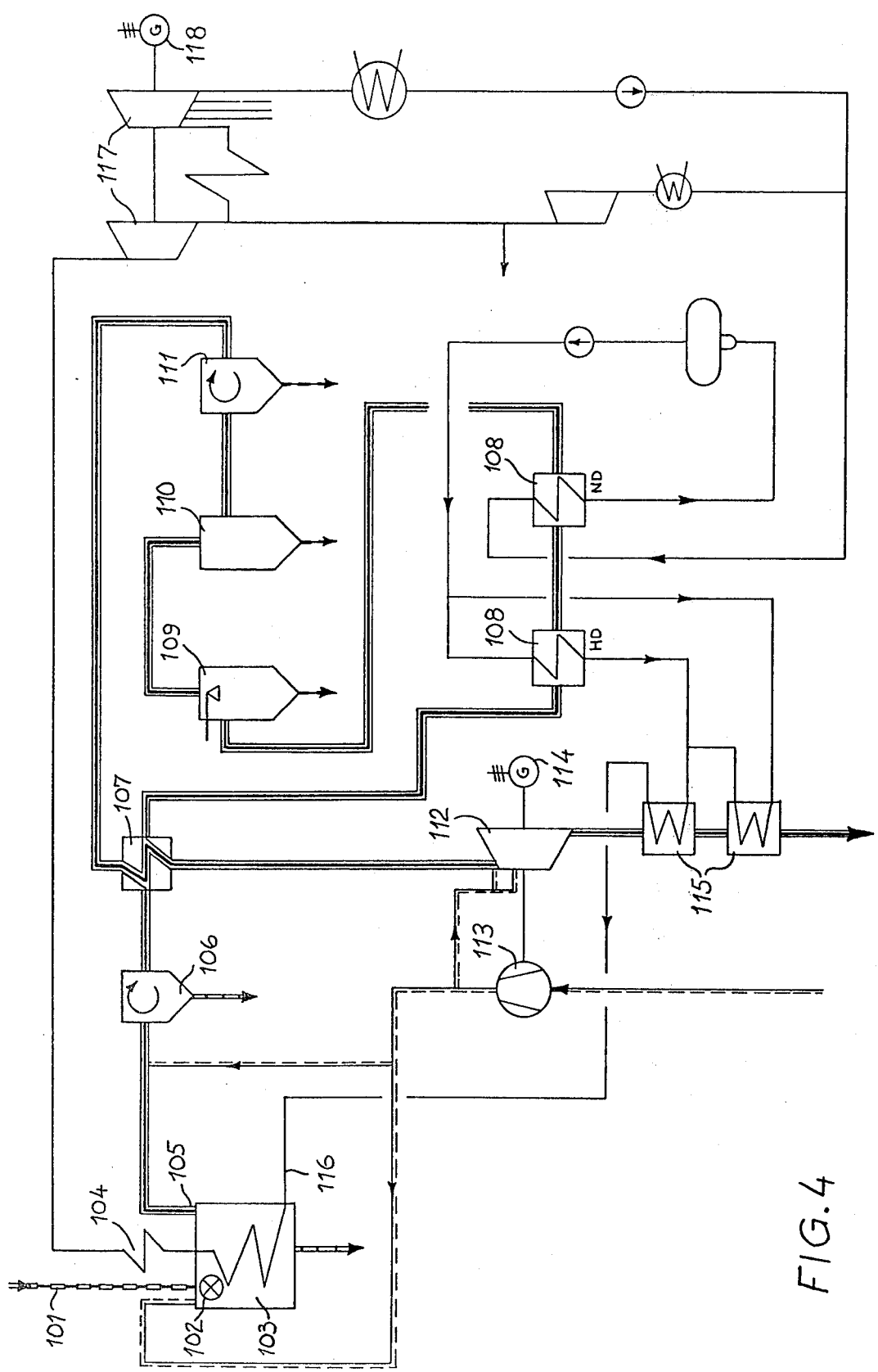
FIG. 4 illustrates a first example of an embodiment of the installation according to the invention having a feed-water preheating stage located between the gas-gas heat exchanger and the flue gas cleaner.
Figure 5:
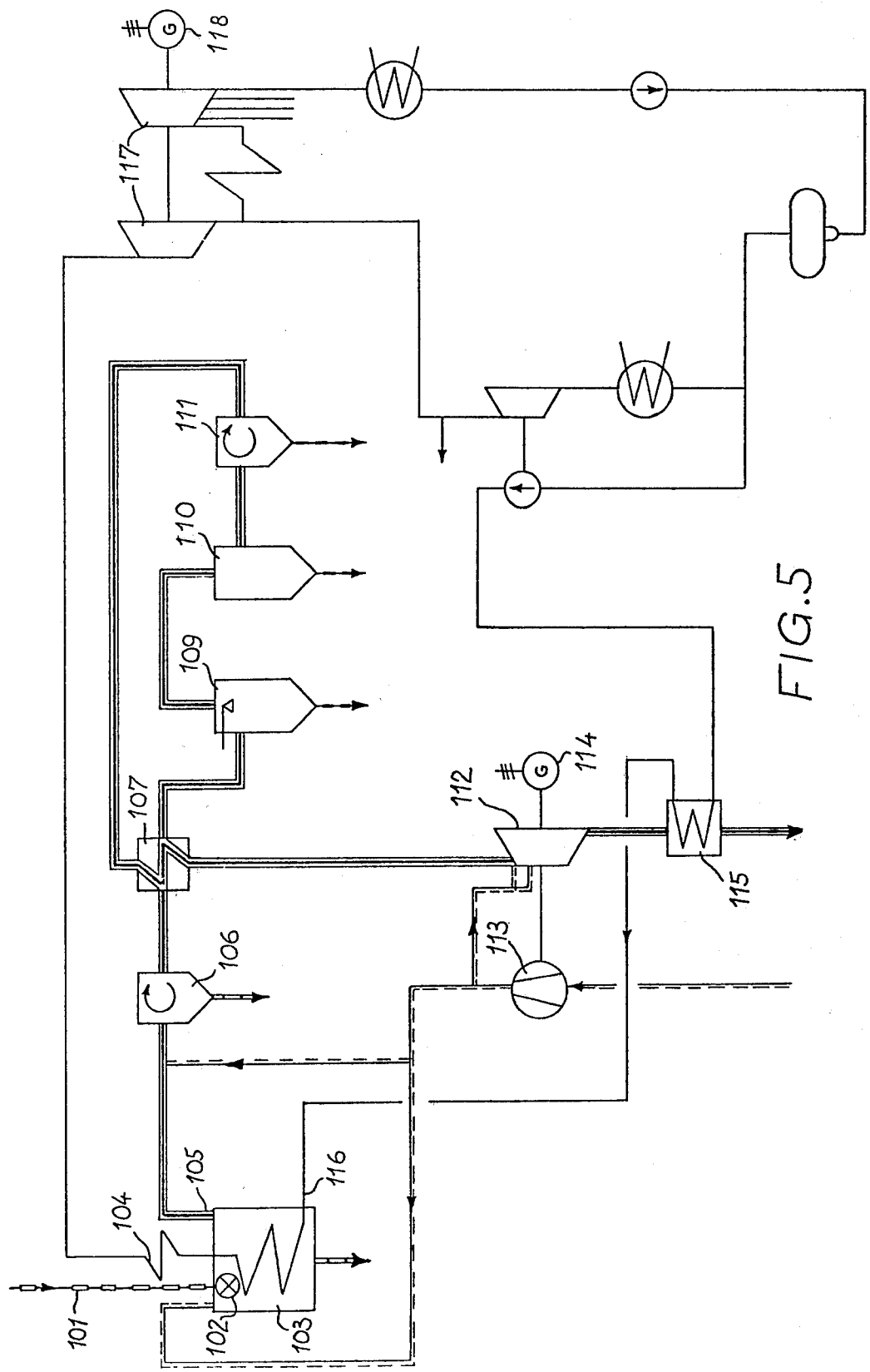
FIG. 5 illustrates an example of an embodiment in which the necessary temperature differential for the gas-gas heat exchanger is obtained merely by adiabatic saturation of the flue-gas.

As shown in FIGS. 4 and 5, ground coal 101, containing inert material, is fed under pressure to the cyclone firing of a wet-bottom boiler marked generally 103.

The coal is burned under pressure, thus evaporating water for the steam-circulating process which is superheated at 104. The flue-gases emerge at 105, are freed from coarse dust in a cyclone separator 106, and are passed to a gas-gas heat exchanger 107, where the uncleaned flue-gas is cooled to about 300° C. by the cold, cleaned gas.

In the installation according to FIG. 4, the flue-gases pass to feed-water preheater 108 where the temperature is reduced by another 100° C., for example. In the following cleaning stage, the said flue-gases are saturated with steam which reduces the temperature, in this example, to about 108° C.

In the installation according to FIG. 5, the flue-gas enters the gas-cleaning unit, immediately after the gas-gas heat exchanger, at a temperature of about 300° C., and is cooled thereto about 118° C. by saturation with steam. Both in FIG. 4 and FIG. 5 the gas-cleaning unit may consist, for example, of an ammoniacal water-wash 109 where dust and detrimental substances such as chlorine, fluorine, and $NO_x$ are removed from the flue-gas. The water-wash is followed by a wet-desulphurizing unit 110 and a spray-separator 111. The cleaned flue-gas enters the gas-gas heat exchanger and is heated by the uncleaned flue-gas to the gas-turbine inlet temperature 851° C. for example. Gas-turbine 112 drives a compressor 113 and a generator 114. Compressor 113 supplies the combustion air required to burn the coal under pressure. Generator 114 supplies the electrical power. After the gas-turbine, the flue-gas passes, at a temperature of 434° C., for example, into waste-heat boiler 115, thus preheating the feed-water needed for the steam-circulating process and being itself cooled to 120° C., for example.

At 116, the preheated feed-water enters the charged boiler chamber, where it is evaporated, superheated at 104, and passed into steam-turbine 117. The latter drives a generator 118 which also supplies electrical power.

In wet-bottom boiler 103, the dust and ash component is drawn off as a fluid which passes to a hydraulic ash-removing unit with a crusher for granular material. This granulated ash can be separated from the water carrying it and removed.

What is claimed is:

1. An installation for recovering energy from solid fossil fuels, more particularly, fuels high in inerts, and particularly bituminous coal, said installation comprising;
   at least one steam generating, wet bottom boiler pressure fired with ground fuel for converting the solid fuel to flue gas;
   gas turbine means operable by the flue gas for driving electrical generations means;
   steam turbine means operable by the steam from said boiler for driving electrical generation means;
   desulfurizing means interposed between said boiler and said gas turbine;
   gas-gas heat exchanger means interposed between said wet bottom boiler and gas turbine in which pressurized flue gases emerging from said wet-bottom boiler are cooled by subsequently treated flue gases;
   dust removing means interposed between said boiler and said gas turbine;
   first gas-liquid heat exchanger means interposed in the outlet of said gas turbine means, in which the flue gases emerging from said turbine heat feed water for said boiler;
   second gas-liquid heat exchanger means interposed between said gas-gas heat exchanger and said desulfurizing means, in which flue gases emerging from said gas-gas heat exchanger means preheat feed water for said wet-bottom boiler; and
   a washing unit interposed downstream of said second gas-gas heat exchanger for removing dust, $SO_2$, chlorine, fluorine and $NO_x$ from the flue gases, said cleaned flue gases being reheated in said gas-gas heat exchanger to drive said gas turbine.

2. An installation according to claim 1 including a washing unit interposed downstream of said gas-gas heat exchanger for removing dust, $SO_2$, chlorine, fluorine and $NO_x$ from the flue gases, said cleaned flue gases being reheated in said gas-gas heat exchanger to drive said gas turbine.

3. An installation according to claim 1 wherein said dust removing means employs ceramic candle-filters for separating dust.

4. An installation according to claim 1 wherein said dust removing means utilizes separating nozzles for separating dust.

* * * * *